United States Patent [19]

Yasue et al.

[11] Patent Number: 4,709,597
[45] Date of Patent: Dec. 1, 1987

[54] HYDRAULIC CONTROL SYSTEM IN AN AUTOMATIC TRANSMISSION FOR A VEHICLE

[75] Inventors: Hideki Yasue; Kagenori Fukumura, both of Toyota, Japan

[73] Assignee: Toyota Jidosha Kabushiki Kaisha, Aichi, Japan

[21] Appl. No.: 865,372

[22] Filed: May 21, 1986

[30] Foreign Application Priority Data

May 21, 1985 [JP] Japan .................. 60-108929

[51] Int. Cl.⁴ .................................... B60K 41/24
[52] U.S. Cl. .................... 74/868; 74/752 C
[58] Field of Search ............ 74/861, 867, 868, 869, 74/752 C, 753, 866

[56] References Cited

U.S. PATENT DOCUMENTS

| | | | |
|---|---|---|---|
| 3,951,011 | 4/1976 | Lemon | 74/868 |
| 4,148,232 | 4/1979 | Moriya | 74/867 |
| 4,274,307 | 6/1981 | Iwanaga et al. | 74/868 |
| 4,291,596 | 9/1981 | Sakakibara | 74/867 |
| 4,467,675 | 8/1984 | Sugano et al. | 74/867 |
| 4,519,273 | 5/1985 | Shimizu | 74/867 X |
| 4,541,308 | 9/1985 | Person et al. | 74/868 |

Primary Examiner—Leslie Braun
Assistant Examiner—David Novais
Attorney, Agent, or Firm—Oblon, Fisher, Spivak, McClelland & Maier

[57] ABSTRACT

A hydraulic control system of an automatic transmission for a vehicle, wherein, in order to achieve an up shift from a specific gear stage to another gear stage in a drive range, there are provided a frictionally engaging device for the normal engagement arranged in series with a one-way clutch and a frictionally engaging device for coasting during engine braking action arranged in parallel to said frictionally engaging device for normal engagement. Hydraulic oil pressure of the frictionally engaging device for normal engagement is controlled in response to a rise or fall in hydraulic oil pressure of the frictionally engaging device for the coasting mode. Thus, combined use of the frictionally engaging device for the coasting mode makes it possible to improve the durability of the frictionally engaging device for normal engagement and decrease the occurrence of shocks generated during shifting operation.

3 Claims, 7 Drawing Figures

|   |     | $C_0$ | $C_1$ | $C_2$ | $B_0$ | $B_1$ | $B_2$ | $B_3$ | $F_0$ | $F_1$ | $F_2$ |
|---|-----|---|---|---|---|---|---|---|---|---|---|
| P |     | O | X | X | X | X | X | O |   |   |   |
| R |     | O | X | O | X | X | X | O | O |   | O |
| N |     | O | X | X | X | X | X | X |   |   |   |
| D | 1   | O | O | X | X | X | X | X | O | X | O |
|   | 2   | O | O | X | X | ◎ | O | X | O | O | X |
|   | 3   | O | O | O | X | X | O | X | O | X | X |
|   | OD  | X | O | O | O | X | O | X | X | X | X |
| 2 | 1   | O | O | X | X | X | X | X | O | X | O |
|   | 2   | O | O | X | X | O | O | X | O | O | X |
| L |     | O | O | X | X | X | X | O | O | X | O |

HYDRAULIC CONTROL SYSTEM IN AN AUTOMATIC TRANSMISSION FOR A VEHICLE

BACKGROUND OF THE INVENTION

1. Field of the Invention

This invention relates to a hydraulic control system in an automatic transmission for a vehicle, and more particularly to improvements in a hydraulic control system in an automatic transmission for a vehicle, wherein, in order to achieve an up shift from a specific gear stage to another gear stage in a drive range (D.range), there are provided a frictionally engaging device for the normal engagement arranged in series with a one-way clutch and a frictionally engaging device for the coasting during engine braking action arranged in parallel to the frictionally engaging device for the normal engagement.

2. Description of the Prior Art

There has been widely known an automatic transmission for a vehicle, constructed such that a gear stage changing mechanism and a plurality of frictionally engaging devices (clutches and brakes) are provided, and a hydraulic control system is operated to selectively change the engagement of the frictionally engaging devices, to thereby achieve any one of a plurality of gear stages.

An automatic transmission, wherein planetary gear units are utilized as the gear stage changing mechanism, can achieve gear stages of low, high, and reverse by an arrangement wherein an input shaft, an output shaft and the planetary gear units are provided coaxially with one another, and clutches, brakes and one-way clutches are combined. Accordingly, an automatic transmission of this type has been combined with a torque converter, to thereby be commonly used as the automatic transmission for the vehicle.

In the case of the automatic transmission for a vehicle, in the gear stage in the low speed range, the rotational speed to be transmitted to the output shaft is low, however, the torque to be transmitted is high. As a consequence, clutches, brakes and the like for rotating and braking the gears of the planetary gear units are subjected to severe durability standards. When the engine has a large piston displacement, the throttle opening is large etc. and the torque to be transmitted is further increased, the requirement for durability becomes even more severe. Particularly, a frictionally engaging device for the 2nd gear stage, which is to be newly engaged at the 1st–2nd gear shaft through a one-way clutch, is frequently used during running of the vehicle, whereby this frictionally engaging device is referred to one subjected to the most severe conditions.

On the other hand, as the FF (Front engine—Front wheel drive) has been used more widely in the driving system of a vehicle, there have occurred trends of high rpms and high output in the engines mounted on the vehicle. An automatic transmission in a vehicle of the FF type presents a disadvantage in that it is extremely difficult to increase the number of plates in a multi-plate clutch and in a multi-plate brake of frictionally engaging devices, due to the restriction placed upon the total length of the automatic transmission. In view of the above-described disadvantage, in order to improve the durability of the frictionally engaging devices in the automatic transmission, there has been proposed an automatic transmission, wherein, at the time of an up shift, e.g. from the 1st gear stage to the 2nd gear stage in the drive range (D.range), in addition to a frictionally engaging device for the 2nd gear stage, which is normally engaged, a frictionally engaging device for coasting, which is engaged during engine braking in a so-called 2nd range running, is used as an auxiliary one.

However, with the conventional automatic transmission of this type, the number of socks occurring during shifts become high, because such is a frictionally engaging device, which has been originally designed to have a capacity capable of transmitting solely the torque, and moreover, is used simultaneously with the frictionally engaging device for the coasting mode.

SUMMARY OF THE INVENTION

The present invention has been developed to obviate the above-described disadvantages of the prior art and has as its object the provision of a hydraulic control system in an automatic transmission for a vehicle, wherein, in the automatic transmission described above, a frictionally engaging device, which is normally engaged at the time of an up shift can be improved in terms of durability, and shift shocks occurring during shifts can be reduced.

To achieve the above-described object, the present invention contemplates that, in a hydraulic control system of an automatic transmission for a vehicle, wherein, in order to achieve an up shift from a specific gear stage to another gear stage in a drive range (D.range), in addition to a frictionally engaging device for the normal engagement arranged in series with a one-way clutch, a frictionally engaging device for coasting during engine braking action arranged in parallel to the frictionally engaging device for the normal engagement is engaged, and there is provided means for controlling hydraulic oil pressure of the frictionally engaging device for normal engagement commensurate with hydraulic oil pressure of the frictionally engaging device being supplied for coasting.

A specific form of the present invention is of such an arrangement that, as means for controlling hydraulic oil pressure of the frictionally engaging device for normal engagement, there is used an accumulator control valve for reducing the back pressure of an accumulator of the frictionally engaging device for normal engagement in response to a rise in hydraulic oil pressure of the frictionally engaging device for the coasting, to achieve the above-described object in particular without using a computer and a solenoid valve and the like driven by the computer.

Another specific form of the present invention is of such an arrangement that, as means for controlling hydraulic oil pressure of the frictionally engaging device for normal engagement, there is used a solenoid valve for leading oil in an oil line for the frictionally engaging device for the normal engagement to a drain line in response to a command from a computer, so that hydraulic oil pressure in an oil line to the frictionally engaging device for coasting can be controlled with accurate synchronism with timing of shifting.

According to the present invention, the hyraulic oil pressure of the frictionally engaging device for normal engagement is controlled with a rise or a fall of the hydraulic oil pressure of the frictionally engaging device for coasting, whereby, at a stage where the frictionally engaging device for the coasting begins to engage, hydraulic oil pressure of the frictionally engaging device for the normal engagement can be reduced commensurate with a torque borne by the frictionally engaging device for coasting, so that the shift shocks can be reduced, with improved durability due to the combined use of the frictionally engaging device for coasting maintaining.

Furthermore, according to the present invention, the degree of shift shock can be reduced during up shift from the 1st gear stage to the 2nd gear stage in the 2nd range running, in which an increase in the shift shocks would not be avoidable.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

A detailed description will now be given of embodiments of the present invention with reference to the accompanying drawings.

Figures 2, 3:
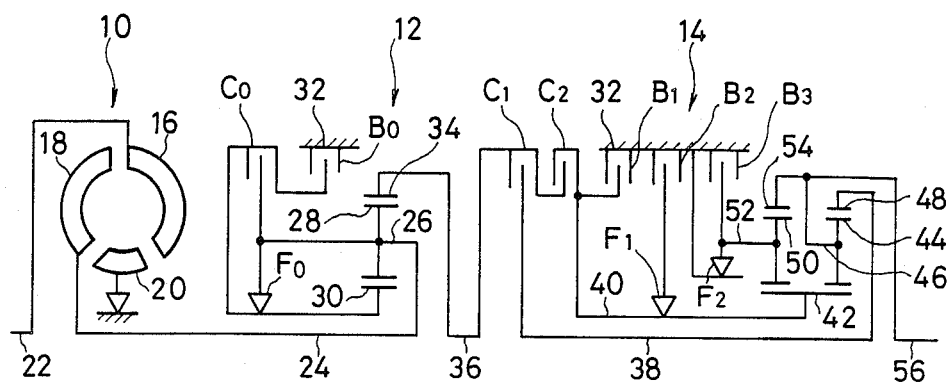
FIG. 2 is a skeletal diagram showing a transmission section of the automatic transmission according to the above-mentioned embodiment.
FIG. 3 is a chart showing the states of the frictionally engaging devices being engaged and assembled.

FIG. 2 is a skeletal diagram showing the transmission section of a fluid type automatic transmission having four gear stages and an overdrive mechanism according to a first embodiment of the present invention.

This automatic transmission comprises a torque converter 10; an overdrive mechanism 12; and an underdrive mechanism 14 having three forward gear stages and one backup gear stage.

The torque converter 10 is well known and includes a pump 16, a turbine 18 and a stator 20. The pump 16 is connected to an engine crankshaft 22, and the turbine 18 is connected to a turbine shaft 24. The turbine shaft 24 is an output shaft of the torque converter 10 and, at the same time, is an input shaft of the overdrive mechanism 12, and is connected to a carrier 26 of a planetary gear unit in the overdrive mechanism 12.

In the overdrive mechanism 12, a planetary pinion 28 rotatably supported by this carrier 26 is in mesh with a sun gear 30 and a ring gear 34. Furthermore, an overdrive clutch C0 and a one-way clutch F0 are interposed between the sun gear 30 and the carrier 26. Furthermore, an overdrive brake B0 is interposed between the sun gear 30 and a housing 32. surrounding the overdrive mechanism 12.

A ring gear 34 of the overdrive mechanism 12 is connected to an input shaft 36 of the underdrive mechanism 14, and a forward clutch C1 is interposed between the input shaft 36 and an intermediate shaft 38.

The underdrive mechanism 14 is provided with two trains of planetary gear units including a front and rear gear unit. The front planetary gear unit comprises a sun gear 42 provided on a sun gear shaft 40 used commonly between the front and the rear planetary gear units; a planetary pinion 44 being in mesh with the sun gear 42; a carrier 46 rotatably supporting the planetary pinion 44; and a ring gear 48 being in mesh with the planetary pinion 44. The rear planetary gear unit comprises a planetary pinion 50 in mesh with the sun gear 42; a carrier 52 rotatably supporting the planetary pinion 50; and a ring gear 54 in mesh with the planetary pinion 50.

A direct clutch C2 is interposed between the input shaft 36 and the sun gear shaft 40. Furthermore, the ring gear 48 in the front planetary gear unit is connected to the intermediate shaft 38. Further, the carrier 46 in the front planetary gear unit is connected to the ring gear 54 in the rear planetary gear unit, and carrier 46 and ring gear 54 are connected to an output shaft 56. Interposed between the carrier 52 in the rear planetary gear unit and the housing 32 are a 1st & reverse brake B3 and a one-way clutch F2.

Here, designated at B2 is a 2nd brake to be normally engaged in order to achieve an up shift from the 1st gear stage to the 2nd gear stage. This 2nd brake B2 is interposed between the sun gear shaft 40 and the housing 32 by way of a one-way clutch F1, so as to cooperate with the one-way clutch F1 in preventing the sun gear 42 from rotating in a predetermined direction.

Furthermore, designated at B1 is a 2nd coast brake to be engaged during engine braking action in the 2nd range running. This 2nd coast brake B1 is interposed between the sun gear shaft 40 and the housing 32, and the brake B1 avoids the occurrence of a force in a direction reverse to the aforesaid predetermined direction acting upon the sun gear 42, whereby the one-way clutch F1 does not allow the sun gear 42 to rotate idly, such that the 2nd coast brake B1 fixes the sun gear 42, enabling carrying out of engine braking action. Additionally, the 2nd coast brake B1 can act only in the 2nd gear stage.

FIG. 3 shows the gear stage positions and the clutches and brakes in operating conditions.

Here, a circle indicates that the clutches and brakes are in engaged or locked stages, whereas x indicates that the clutches and brakes are in opened or overrun states.

As is apparent from FIG. 3, the 2nd brake B2, which has not been engaged in the 1st gear stage, is engaged anew, whereby the transition to the 2nd gear stage is performed. Here, in this automatic transmission, as indicated by two concentric circle in FIG. 3, the 2nd coast brake B1, which has been originally designated to be engaged during engine brake action, is engaged, so that the 2nd brake B2 can be improved in terms of durability.

Figure 1:
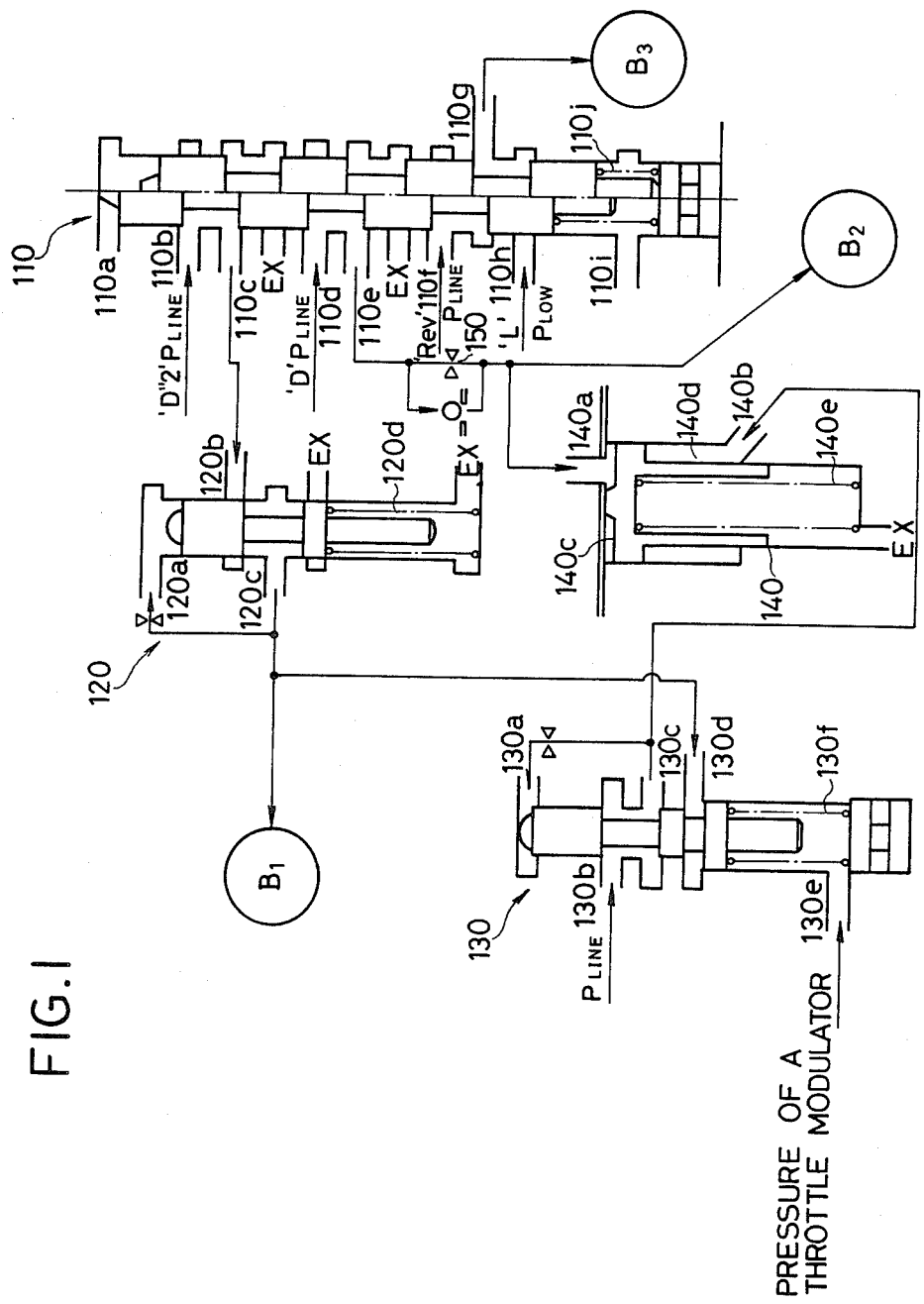
FIG. 1 is a hydraulic circuit diagram partially showing a hydraulic control circuit of the automatic transmission for a vehicle, to which is applied an embodiment of the hydraulic control system of the automatic transmission according to the present invention.

FIG. 1 partially shows the hydraulic control circuit used in the above-described automatic transmission.

Referring to the drawing, designated at 110 is a 1-2 shift valve for switching between the 1st gear stage and the 2nd gear stage, 120 is a 2nd coast modulator valve for regulating hydraulic oil pressure to the 2nd coast brake B1, and 130 is an accumulator control valve for controlling the back pressure of a B2 accumulator 140 in response to the rise of the hydraulic oil pressure to the 2nd coast brake B1.

The respective arrangements of these valves 110, 120, 130 and the B2 accumulator 140 are not particularly different from the well known conventional ones in their basic functions, such that a detailed description will not be repeated. However a brief description thereof will be now presented. The 1–2 shift valve 110 is the valve adapted to be switched due to a balance between hydraulic oil pressures acting on ports 110a, 110i and the resiliency of a spring 110j, and the right side in the drawing shows the state of the 1st gear stage and the left side shows the state of the 2nd gear stage. When the 1–2 shift valve 110 is in the 1st gear stage, the line pressure in the D.range acting on a port 110d and the line pressure in the D.range and the 2.range acting on a port 110b, are cut off, whereby no line pressure is supplied to the 2nd brake B2 and the 2nd coast brake B1, such that both the brakes B2 and B1 are brought into released states. Furthermore, in the case of the L.range, a port 110h acting under the pressure of a low coast modulator in the L.range is communicated with a port 110g, whereby the 1st & reverse brake B3 is engaged so as to achieve the engine braking condition. On the other hand, when the 1–2 shift valve 110 is in the 2nd range, the port 110d and a port 110e are communicated with each other, whereby the line pressure in the D.range is supplied to the B2 accumulator 140 and the 2nd brake B2, through an orifice 150, so that the 2nd brake B2 engages. Furthermore, the port 110b and a port 110c are communicated with each other, whereby the line pressures in the D.range and the 2nd range are led to the 2nd coast modulator valve 120. The modulator pressure regulated in the 2nd coast modulator valve 120 is supplied to the 2nd coast brake B1, whereby the brake B1 is brought into the engaged state. Furthermore, the line pressure in the L.range is cut off by the 1-2 shift valve 110, and the port 110g and a port 110f are communicated with each other, whereby the 1st & reverse brake B3 is drained through a line pressure oil line at the time of the reverse mode, so that the brake B3 is released.

The 2nd coast modulator valve 120 regulates the line pressure acting on the port 110b to the pressure of the 2nd coast modulator, which level is less than the line pressure, by means of the hydraulic oil pressure acting on a port 120a and the resiliency of a spring 120d, and outputs the pressure of the 2nd coast modulator from a port 120c.

An accumulator control valve 130 regulates the line pressure of a port 130b and supplies the regulated pressure from a port 130c. The pressure of the accumulator control thus regulated is supplied to a port 140b of the B2 accumulator 140, and the pressure operates as the back pressure of the B2 accumulator 140. Furthermore, this accumulator control valve 130 is the valve actuated by the pressure of the accumulator control acting on a port 130a, the pressure of the 2nd coast modulator acting on a port 130d, the pressure of a throttle modulator acting on a port 130e and by the resiliency of a spring 130f, and, basically, the higher the throttle opening is, the higher the pressure of the accumulator control becomes. When the pressure of the 2nd coast modulator operates, the pressure of the accumulator control is decreased.

The B2 accumulator 140 regulates the pressure toward the 2nd brake B2 to a higher level when the back pressure the accumulator control pressure) acting on the port 140b is high, and regulates the pressure to a lower level when the back pressure is low, by the well known function.

Additionally, the arrangements of other components in the hydraulic control system and the connected states thereof are not particularly different from the conventional ones, so that an illustration and description thereof will be omitted.

Figure 4:
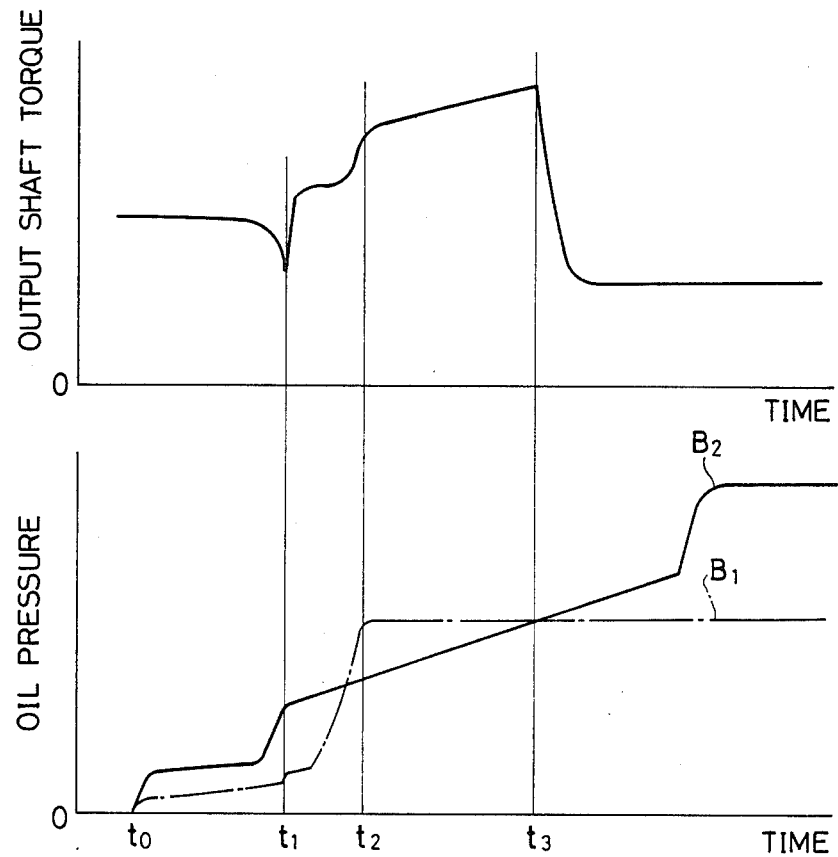
FIGS. 4 and 5 are charts of characteristics curves during up shift from the 1st gear stage to the 2nd gear stage in a conventional example and according to the above-mentioned embodiment, respectively.

FIG. 4 shows the shift characteristics during up shift from the 1st gear stage to the 2nd gear stage in the absence of the present invention.

Prior to a time t0, the 1–2 shift valve 110 is in the 1st gear, and both the second brake B2 and the 2nd coast brake B1 are released.

When the 1–2 shift valve 110 is switched into the 2nd gear stage at the timing t0, the port 110d and the port 110e are communicated with each other, whereby the line pressure is supplied to the 2nd brake B2 and the B2 accumulator 140, so that a piston of the 2nd brake B2 begins to move. Furthermore, the ports 110b and 110c are communicated with each other, whereby the line pressure is supplied to the 2nd coast modulator valve 120, and the ports 120b and 120c are communicated with each other, so that the oil pressure acts on the 2nd coast brake B1 to start movement of a piston of the brake B1.

When a time t1 is reached, the piston of the 2nd brake B2 completes its movement, whereby the brake B2 begins to engage. At this time, the B2 accumulator 140 operates to moderately raise the hydraulic oil pressure of the 2nd brake B2.

When a time t2 is reached, the piston of the 2nd coast brake B1 completes movement, and this brake B1 begins to engage. As a consequence, the output shaft torque is increased by a torque capacity of the 2nd coast brake B1, and the shift shock is increased accordingly.

When a time t3 is reached, the engagements of the 2nd brake B2 and the 2nd coast brake B1 are completed so as to finish the shift.

Figure 5:
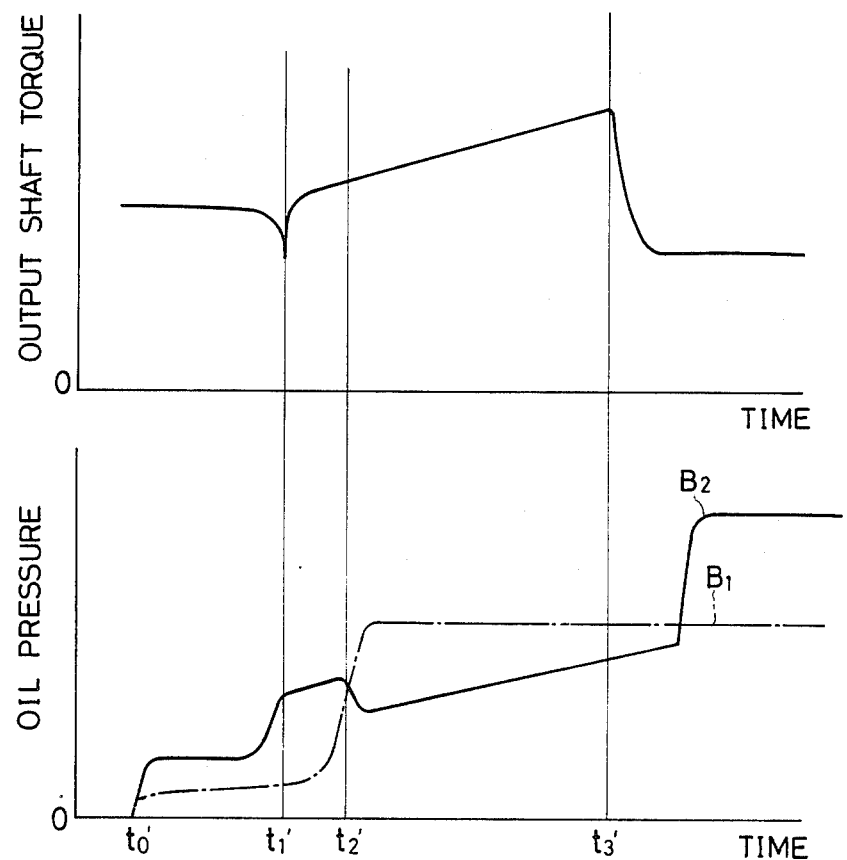

FIG. 5 shows the shift characteristics during up shift from the 1st gear stage to the 2nd gear stage in the above-described embodiment.

Since the 1-2 shift valve 110 is in the 1st gear stage prior to a time t0', both the 2nd brake B2 and the 2nd coast brake B1 are released.

When the time t0' is reached, the 1-2 shift valve 110 is switched into the 2nd gear stage, whereby the ports 110d and 110c are communicated with each other, so that the line pressure is supplied to the 2nd brake B2 and the B2 accumulator 140 to start moving the piston of the 2nd brake B2. Furthermore, since the ports 110b and 110c are communicated with each other, the line pressure is supplied to the 2nd coast modulator valve 120, whereby the ports 120b and 120c are communicated with each other, so that the oil pressure acts on the 2nd coast brake B1 to start movement of the piston of the brake B1.

Since the oil pressure acting on the 2nd coast brake B1 also acts on the port 130d of the accumulator control valve 130, the pressure of the accumulator control is decreased with the increase of the oil pressure to the 2nd coast brake B1.

When a time t1' is reached, the piston of the 2nd brake B2 completes its movement and the brake B2 begins to engage. At this time, the B2 accumulator 140 operates to moderately raise the oil pressure to the 2nd brake B2.

When a time t2' is reached, the piston of the 2nd coast brake B1 also completes its movement, whereby the oil pressure acting on the brake B1 is raised to the level of the pressure of the 2nd cost modulator so as to begin engagement. However, according to this embodiment, the pressure of the 2nd coast modulator acts on the port 130d of the accumulator control valve 130, whereby the pressure of the accumulator control is decreased with the increase of the oil pressure to the 2nd coast brake B1. As a consequence, the oil pressure acting on a back pressure chamber 140d of the B2 accumulator 140 is decreased, whereby the oil pressure of the 2nd brake B2 is decreased. Because of this, the above-mentioned sharp increase in the output torque can be obviated.

When a time t3' is reached, the engagements of the 2nd brake B2 and the 2nd coast brake B1 are completed to finish the shift.

Figure 6:
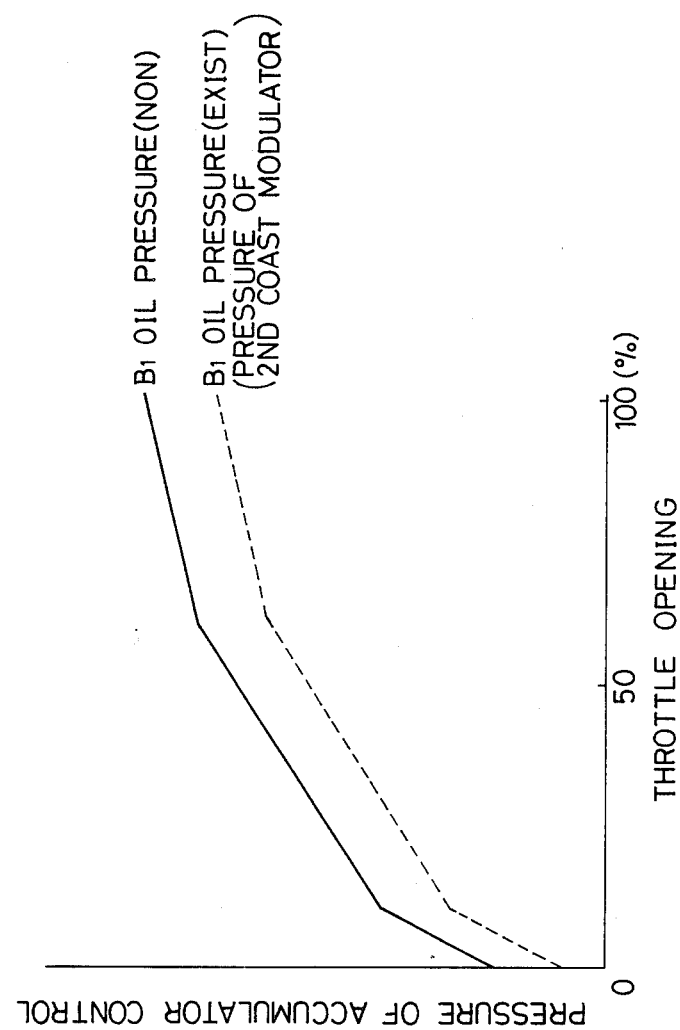
FIG. 6 is a schematic diagram showing the relationship between the throttle opening and the pressure of the accumulator control in the above-mentioned embodiment.

FIG. 6 shows the relationship between the pressure of the accumulator control and the throttle opening in the above-mentioned embodiment. As is apparent from this figure, as compared with the case where the oil pressure does not act on the 2nd coast brake B1, when the oil pressure acts on the brake B1 (when the pressure of the 2nd coast modulator is generated), regulation occurs so as to lower the pressure of the accumulator control. This means that, as the 2nd coast brake B1 is operated, the oil pressure of the 2nd brake B2 is regulated to a lower level.

Figure 7:
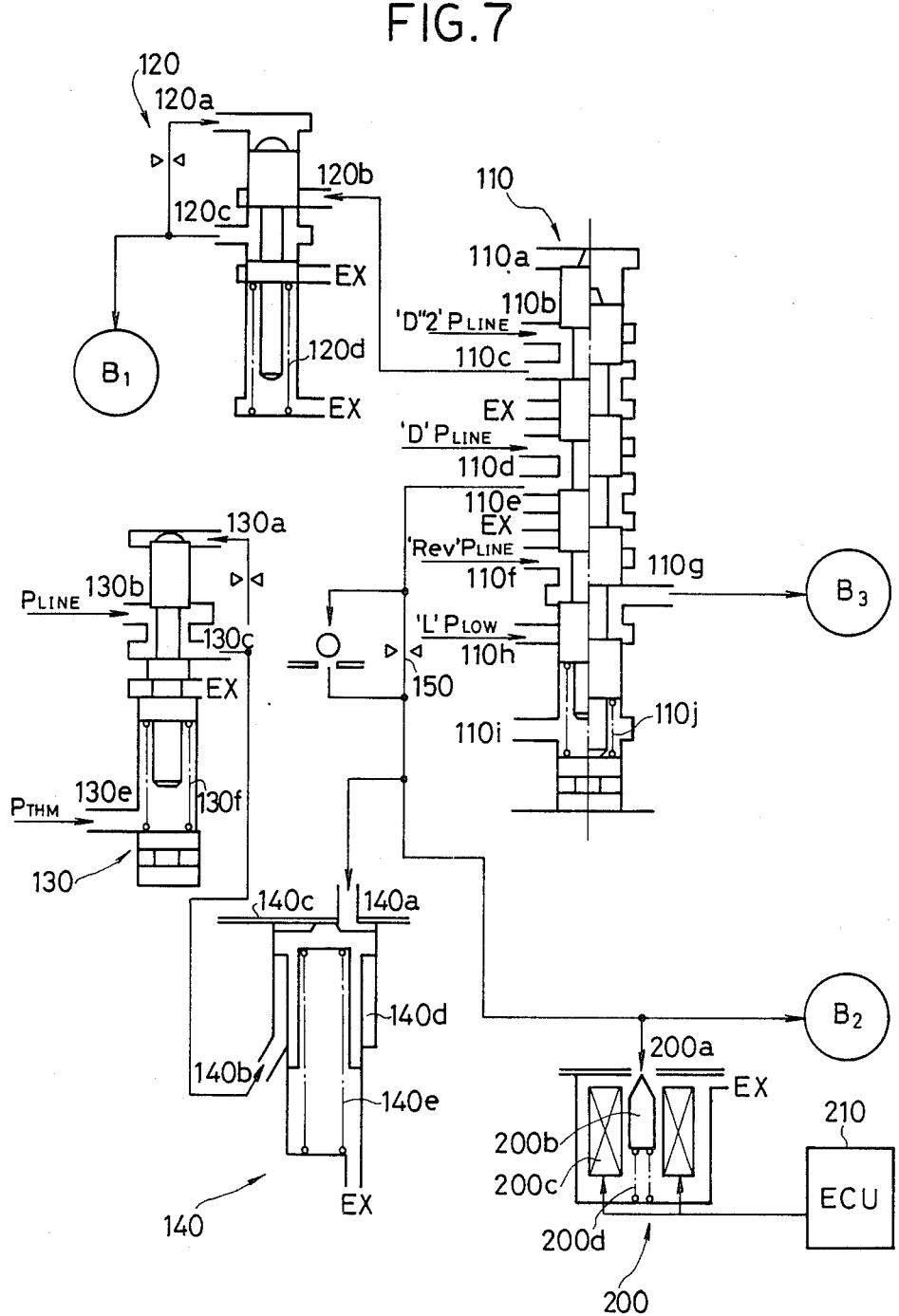
FIG. 7 is a hydraulic circuit diagram showing a second embodiment of the present invention but otherwise corresponding to FIG. 1.

FIG. 7 shows another embodiment of the present invention. The diferences of this embodiment from the preceding embodiment are that the oil pressure to the 2nd coast brake B1 (the pressure of the 2nd coast modulator) is not used for the feedback of the accumulator control valve 130 and that a B2 solenoid valve 200 is provided in an oil line to the 2nd brake B2.

Description will now be given with emphasis on the differences. In this embodiment, when the oil pressure acts on the 2nd coast brake B1 at the time of up shift from the 1st gear stage to the 2nd gear stage, the oil pressure of the 2nd brake B2 is temporarily decreased by use of the B2 solenoid valve 200, without decreasing the pressure of the accumulator control. The B2 solenoid valve 200 is controlled by a microcomputer 210. The B2 solenoid valve 200 comprises an oil pressure port 200a, a valve 200b, a solenoid 200c and a spring 200d, and is contructed such that the valve 200b is moved in response to a control signal from the microcomputer 210 so as to open or close an oil line leading to a for draining the oil port 200a to the 2nd brake B2. The timing for operating the B2 solenoid valve 200 is provided in response to an oil pressure signal (not shown) to the 2nd coast brake B1 inputted to the microcomputer 210 or a timer control after a shift demand occurs from the 1st gear stage to the 2nd gear stage.

The shift characteristics during up shift from the 1st gear stage to the 2nd gear stage in this embodiment is identical with the one shown in FIG. 5. More specifically, in FIG. 5, after the time t2', the B2 solenoid valve 200 operates to temporarlly decrease the oil pressure to the 2nd brake B2. Thus, a sharply increased output shaft torque can be avoided generated due to the engagement of the brake B1 under high oil pressure resulting from the oil pressure of the 2nd coast brake B1 which would otherwise continue to be raised.

Additionally, in the above embodiment, decription has been given of the example of up shift from the 1st gear stage to the 2nd gear stage. However, it will be apparent to those skilled in the art that the present invention is applicable to other shift sequences under conditions similar to those described above.

What is claimed as new and desired to be secured by Letters Patent of the United States is:

1. In an automatic transmission for a vehicle having a plurality of gears for providing a plurality of forward speed stages and a plurality of frictionally engaging devices for being selectively engaged and disenaged to achieve said plurality of forward speed stages, said plurality of frictionally engaging devices including a first frictionally engaging device in series with a one-way clutch and a second frictionally engaging device for a coasting mode during engine braking action, said second frictionally engaging device being disposed in parallel with said first frictionally engaging device;

a hydraulic control system for selectively engaging and disengaging said plurality of frictionally engaging devices in a forward running range to achieve said plurality of forward speed stages, said hydraulic control system comprising means for supplying hydraulic oil pressure to said first and second frictionally engaging devices to cause both said first and second frictionally engaging devices to change from a state of disengagement to a state of engagement during an upshift from one of said speed stages to another, said hydraulic control system further comprising means for controlling the increase of hydraulic oil pressure to said first and second frictionally engaging devices during said upshift such that the pressure increase to one of said first and second frictionally engaging devices is temporarily reduced during the engagement of the other of said first and second frictionally engaging devices.

2. Apparatus according to claim 1, wherein said means for controlling hydraulic oil pressure to said one frictionally engaging device comprises an accumulator control valve for reducing back pressure of an accumulator of said frictionally engaging device in response to a rise in hydraulic oil pressure to said other frictionally engaging device.

3. Apparatus according to claim 1, wherein said means for controlling hydraulic oil pressure to said one frictionally engaging device comprises a computer and a solenoid valve for temporarily draining oil in an oil line of said one frictionally engaging device in response to a command from said computer.

* * * * *